United States Patent [19]

Suga et al.

[11] Patent Number: 5,073,427
[45] Date of Patent: Dec. 17, 1991

[54] SUBSTRATE OF OPTICAL DISC

[75] Inventors: Yoshinori Suga, Tokyo; Eiji Tanaka, Kanagawa; Satoshi Kato; Kaoru Sato, both of Tokyo, all of Japan

[73] Assignee: Mitsubishi Kasei Corporation, Tokyo, Japan

[21] Appl. No.: 558,537

[22] Filed: Jul. 27, 1990

[30] Foreign Application Priority Data

Jul. 28, 1989 [JP] Japan .................................. 1-195961

[51] Int. Cl.$^5$ .............................................. B32R 3/02
[52] U.S. Cl. .......................................... 428/64; 428/65; 428/409; 428/411.1; 428/413; 369/272; 346/76 L; 346/135.1
[58] Field of Search ................ 428/64, 65, 409, 411.1, 428/913; 369/272, 275, 384, 386, 388; 346/76 L, 135.1

[56] References Cited

FOREIGN PATENT DOCUMENTS 1-294753  11/1989  Japan .
0215170   1/1990   Japan .
1-318015  12/1990  Japan .

Primary Examiner—Patrick J. Ryan
Attorney, Agent, or Firm—Sughrue, Mion, Zinn, Macpeak & Seas

[57] ABSTRACT

A substrate for an optical disc is disclosed, which comprises a transparent hydrocarbon resin having a softening point of not less than 100° C., the surface thereof having been contact treated with a fluorine-containing gas so that the treated surface has a contact angle with water of not more than 90° and the weight gain due to the treatment does not exceed 1% by weight. The substrate exhibits excellent adhesion to a recording layer formed thereon and excellent heat resistance.

6 Claims, No Drawings

SUBSTRATE OF OPTICAL DISC

FIELD OF THE INVENTION

The present invention relates to a substrate of optical discs and, more particularly, to a substrate of optical discs excellent in adhesion to a recording layer formed thereon.

BACKGROUND OF THE INVENTION

In recent years, optical recording media using a laser as a light source have undergone marked development because of the possibility of high density recording, preservation and reproduction of information. An optical disc, included in such optical recording media, has a basic structure generally comprising a transparent substrate and a recording layer of various types coated thereon.

The transparent substrate for optical discs comprises in many cases a colorless transparent synthetic resin which typically includes a polycarbonate resin (hereinafter abbreviated as "PC") and a polymethyl methacrylate resin (hereinafter abbreviated as "PMMA"). Besides being superior in colorless transparency, these resins exhibit excellent properties of their own. However, they do not meet all the requirements for a substrate of optical discs, still leaving problems awaiting solution. For example, PC has a problem of high birefringence arising from its aromatic ring and also a problem of its water absorption or penetration properties, and PMMA has turned out to have disadvantages such as insufficient heat resistance, water absorption properties, and insufficient toughness.

The conventional resins have thus been employed while involving problems inherent therein. Besides, in actual use of the conventional resin substrate, different problems arise in relation to a recording layer formed thereon as hereinafter described.

A recording layer which can be used in optical discs has been extensively developed in conformity to end use. Known recording layers include a pit type exclusive for use in writing-reproduction called a write-once type, and a phase transition type utilizing a crystal transition phenomenon or an optomagnetic type utilizing an optomagnetic effect for use in writing-reproduction-erasure-rewriting called an erasable type. The recording layer of the write-once type generally comprises tellurium or an oxide or alloy compounds thereof, and that of the erasable type generally comprises amorphous alloy compounds of rare earth metals and transition metals, e.g., GdFe, TbFe, GdFeCo and TbFeCo, and other inorganic materials. These recording layers are formed on a transparent substrate usually by dry film formation techniques, such as cathode sputtering in a high degree of vacuum.

Water absorption and penetration properties of PC and PMMA cause not only warpage of the substrate per se due to swelling with moisture, but also corrosion of the recording layer due to water content having penetrated through the substrate, resulting in reduction of life of the optical disc.

Further, the recording layer of optical discs particularly of the write-once type and erasable type undergoes a rise in temperature to 200° C or more on writing or erasing information. While this heat is not applied directly to the substrate, the substrate is likely to be heated to a considerably high temperature on writing or erasure. If a low heat-resistant resin is used as a substrate, the substrate or grooves of the substrate would undergo thermal deformation.

In the production of optical discs, a heat treatment is often conducted for the purpose of preventing changes of a substrate or a recording layer with a lapse of time. To increase productivity, it is desirable to conduct the heat treatment at a temperature as high as possible to reduce the treating time. From this point of view, use of a low heat-resistant resin is disadvantageous in that high heat treating temperatures could not be employed and productivity could not be increased accordingly.

In the light of these circumstances, PMMA which has low heat resistance withstands by no means high temperatures during the production of optical discs or on use. It has been hence studied to use PC having higher heat resistance as a material of a transparent substrate. However, PC is not always recognized as sufficient in heat resistance, and it has been demanded to develop a resin material having improved heat resistance.

A transparent resin consisting mainly of carbon and hydrogen (hydrocarbon resins) and having a high softening point has been proposed as a material free from the disadvantages associated with the conventional resins, e.g., PC and PMMA, as disclosed, e.g., in JP-A-63-43910 (the term "JP-A" as used herein means an "unexamined published Japanese patent application").

However, hydrocarbon resins having high softening points have poor adhesion to a recording layer, as is usual with polyolefin resins, and fail to assure a sufficient life of an optical disc.

SUMMARY OF THE INVENTION

An object of the present invention is to provide a substrate of optical discs excellent in adhesion to a recording layer formed thereon.

Other objects and effects of the present invention will be apparent from the following description.

The present inventors have extensively studied on improvement of adhesion of hydrocarbon resins to a recording layer and, as a result, found that adhesion to a recording layer can be markedly improved by treating the surface of a molded article with a fluorine-containing gas, thus having reached the present invention.

The present invention provides a substrate for an optical disc which comprises a transparent hydrocarbon resin having a softening point of not less than 100° C., the surface thereof having been contact treated with a fluorine-containing gas so that the treated surface has a contact angle with water of not more than 90° and the weight gain due to the treatment does not exceed 1% by weight.

DETAILED DESCRIPTION OF THE INVENTION

While examples of the transparent hydrocarbon resin having a softening point of not less than 100° C. which can be used in the present invention includes non-crystalline resins having a high glass transition point which contain an alicyclic structure in the main chain or side chain thereof, those which are crystalline are not excluded as long as they have high transparency.

Examples of the fluorine-containing gas which can be used in the present invention includes mixed gases comprising $F_2$ and $O_2$ diluted with an inert gas, e.g., $N_2$ and Ar.

Non-crystalline hydrocarbon resins having a softening point of not less than 100° C. and containing an alicyclic structure in the main chain or side chain thereof which can be used in the present invention include polyvinylcyclohexane resins.

Polyvinylcyclohexane resins can preferably be obtained by aromatic ring hydrogenation of styrene resins (i.e., styrene polymers).

Included in the starting styrene resins to be hydrogenated are vinyl aromatic hydrocarbon polymers and vinyl aromatic hydrocarbon block copolymers. The latter vinyl aromatic hydrocarbon block copolymers include copolymers comprising a vinyl aromatic hydrocarbon polymer segment (hereinafter referred as segment A) and at least one conjugated diene polymer segment (hereinafter referred to as segment B).

Vinyl aromatic hydrocarbons as monomers include styrene, p-methylstyrene, and α-methylstyrene, with styrene being preferred.

The vinyl aromatic hydrocarbon polymers include homopolymers of these vinyl aromatic hydrocarbon monomers and copolymers comprising two or more of these vinyl aromatic hydrocarbon monomers.

Copolymers obtained by copolymerizing the above-described vinyl aromatic hydrocarbons and other copolymerizable unsaturated monomers within copolymerizing ratios which do not impair the characteristics of vinyl aromatic hydrocarbon polymers may also be employable.

Examples of segment A in the vinyl aromatic hydrocarbon block copolymers include the same as the above-enumerated vinyl aromatic hydrocarbon polymers. Conjugated dienes as segment B include polymers of 1,3-butadiene, isoprene, 2,3-dimethyl-1,3-butadiene, 1,3-pentadiene, and 1,3-hexadiene, with 1,3-butadiene and isoprene being preferably employed.

The block copolymers comprising segments A and B can easily be obtained by known techniques called living anion polymerization in which, for example, polymerization is carried out in a hydrocarbon solvent (e.g., hexane and heptane) in the presence of an organic lithium compound as an initiator. A content of segment A in the block copolymer is generally at least 80% by weight, preferably at least 90% by weight, and more preferably at least 93% by weight. If it is less than 80% by weight, the resin obtained by hydrogenation tends to have insufficient heat resistance for use as a substrate of optical discs.

The starting styrene polymers preferably have a number average molecular weight of 50,000 or more. If the molecular weight of the styrene polymer is too low, the resin obtained by hydrogenation has reduced heat resistance and reduced toughness. The upper limit of the molecular weight is not particularly limited, and is preferably 400,000.

Polyvinylcyclohexane resins can be obtained by aromatic ring hydrogenation of the above-described styrene polymer in the presence of a hydrogenation catalyst capable of catalyzing hydrogenation of an aromatic ring. Examples of catalysts for hydrogenation include metals, e.g., nickel, cobalt, ruthenium, rhodium, platinum, and palladium, and oxides, salts or complexes thereof; and these metals or metal compounds supported on a carrier, e.g., activated carbon, diatomaceous earth, and alumina. From the standpoint of reactivity, preferred of them are Raney nickel, Raney cobalt, stabilized nickel and ruthenium, palladium, and rhodium or platinum carried on carbon or alumina.

The aromatic ring hydrogenation reaction is preferably carried out in a saturated hydrocarbon solvent, e.g., cyclohexane, methylcyclohexane, n-octane, decalin, tetralin and naphtha, or an ether solvent, e.g., tetrahydrofuran (THF), at a temperature of from 100 to 200° C. under a pressure of from 50 to 250 kg/cm$^2$.

The degree of hydrogenation of the aromatic ring is preferably at least 90 mol%, and more preferably at least 95 mol%. If it is less than 90 mol%, the resulting resin tends to undergo reduction in heat resistance and increase in birefringence.

Besides the polyvinylcyclohexane resins, other non-crystalline hydrocarbon polymers which can be used in the present invention include random copolymers prepared by copolymerizing an α-olefin (e.g., ethylene) and a cyclic monoolefin in the presence of a Ziegler catalyst and those obtained by hydrogenating ring-opened polymers prepared by ring-opening polymerization of a cyclic olefin using a metathesis catalyst.

Examples of the α-olefin include ethylene and propylene, with ethylene being preferred. Examples of the cyclic monoolefin to be used in the random copolymers include norbornene, methylnorbornene, dimethano-octahydronaphthalene, and methyldimethano-octahydronaphthalene. Examples of the cyclic olefin to be used in the ring-opening polymerization include those enumerated above and, in addition, polyenes, e.g., dicyclopentadiene and tricyclopentadiene, may also be used as a cyclic olefin.

Hydrogenation of the ring-opened polymers obtained by using a metathesis catalyst is effected in the similar manner as for the preparation of the polyvinylcyclohexane resins in the presence of the similar catalyst for hydrogenation as used above.

The non-crystalline polymers obtained by hydrogenation of the α-olefin/cyclic monoolefin random copolymers are described, e.g., in JP-A-60-168708 and JP-A-61-115912. Those obtained by hydrogenation of ring-opening polymers are described, e.g., in JP-A-60-26024 and JP-A-63-218726.

In addition to the above-described non-crystalline polymers, transparent crystalline polymers obtained by using a catalyst for stereoregular polymerization, such as a polymer of 4-methylpentene-1, can also be used.

The substrate of optical discs according to the present invention can be produced by injection molding. In order to maintain fluidity necessary for injection molding, the hydrocarbon resin which can be used in the present invention preferably has a number average molecular weight of more than 20,000 and not more than 200,000, but the lower limit of the molecular weight is determined depending on the strength of the resin.

The hydrocarbon resin to be used in the present invention has a softening point of not less than 100° C., and preferably not less than 120° C., as measured with a thermomechanical analyzer using a probe of penetration mode under a load of 5 g and at a rate of temperature rise of 5° C./min. If the softening point is too low, deformation of the substrate or grooves would occur.

A heat stabilizer is compounded into the hydrocarbon resin for injection molding. Examples of suitable heat stabilizers include a hindered phenol type, a sulfur type, and a phosphorus type. From the viewpoint of improving thermal deterioration resistance, a combined use of a hindered phenol type heat stabilizer and a phosphorus type heat stabilizer is preferred.

Specific examples of suitable hindered phenol type heat stabilizers are tetrakis(methylene-3-(3,5-di-t-butyl-4-hydroxyphenyl)propionate) methane, 3,9-bis(1,1-dimethyl-2-(β-(3-t-butyl-4-hydroxy-5-methylphenyl)- propionyloxy) ethyl)-2,4,8,10-tetraoxaspiro[5.5]undecane, 1,3,5-tris(3,5-di-t-butyl-4-hydroxybenzyl-s-triazine-2,4,6(1H,3H,5H)-trione, and 1,3,5-trimethyl-2,4,6-tris(3,5-di-t-butyl-4-hydrox-ybenzyl)-benzene.

Specific examples of suitable phosphorus type heat stabilizers are tetrakis(2,4-di-t-butylphenyl)-4,4-bi-phenylene phosphonite and bis(2,6-di-t-butyl-4-methylphenyl)-pentaerythritol diphosphite.

Each of these stabilizers is preferably used in an amount of from 0.01 to 1 part by weight per 100 parts by weight of the hydrocarbon resin.

The manner of compounding the heat stabilizer into the hydrocarbon resin is not particularly restricted. In general, the resin and the stabilizer are dry blended by means of a ribbon blender, a tumbling mixer, a Henschel mixer, etc. and then melt-kneaded and pelletized by means of a Banbury mixer, a single-screw extruder, a twin-screw extruder, etc. The thus prepared pellets are injection molded at a molding temperature of generally from 270 to 350° C., and preferably from 280 to 340° C., to obtain a substrate for an optical disc which is excellent in transparency and heat resistance and free from coloring and has a considerably reduced optical strain.

In the present invention, the thus obtained substrate is subjected to a contact treatment to a slight degree with a fluorine-containing gas.

Commercially available $F_2$ gas, usually containing from about 0.1 to 1.5% by volume of oxygen as an impurity, is used as a fluorine-containing gas. It is preferred to use a mixed gas prepared by diluting such commercially available $F_2$ gas with an inert gas, e.g., Ar and $N_2$. Oxygen or air may also be used as a diluting gas. The $F_2$ content in the mixed gas is generally in the range of from 0.001 to 100 mol%, and preferably not more than 10 mol%. A high $F_2$ content tends to make it difficult to control a level of the treatment.

While the mechanism of action during the contact treatment with a fluorine-containing gas has not yet been clarified, the fact that the treatment brings about a reduction in contact angle with water and an increase in surface polarity appears to be a cause of the increase in adhesion to a recording layer. Oxygen also acts an important role during the contact treatment.

If the contact treatment is performed to an excessive degree, the contact angle once having shown a decrease tends to be increased, and adhesion is reduced with the increase in contact angle. It is considered that such an excessive treatment leads to progress of fluorination of the surface of the substrate, resulting in reduction of surface polarity.

The fluorine treatment depth measured by a secondary ion mass spectrometer (SIMS) is preferably 2,000 Å or less. The method for measuring the fluorine treatment depth by SIMS is described hereinafter.

An apparatus to be used for the contact treatment with a fluorine-containing gas is not particularly limited, and any conventional apparatus may be employed as far as a fluorine-containing gas can uniformly contact with the surface of the substrate.

The treatment is generally carried out at room temperature in a relatively short period of time, generally within 10 hours, and preferably within 1 hour. If the treating time is too long, fluorination excessively proceeds, resulting in reduction of adhesion. Although the lower limit of the treating time is not limited, care should be taken so that the treating gas be uniformly distributed in a treating chamber.

The treatment with a fluorine-containing gas according to the present invention is conducted to such a slight degree that the weight gain of the substrate after the treatment should be not more than 1% by weight, and preferably not more than 0.1% by weight. The surface of the thus treated substrate has a contact angle with water of not more than 90°, and preferably not more than 80°.

An optical disc can be produced by using the resulting substrate by, for example, a process comprising successively forming on the surface of the substrate a film of $SN_x$, $TaO_x$, etc., a recording layer of TbFeCo, etc., and a reflective layer of Al, etc. in this order, each by cathode sputtering, vacuum deposition or the like technique, and finally providing a protective layer thereon. These processes are described, e.g., in *Nikkei New Materials*, No. 76, pp. 31 (1990).

The thickness of a substrate for an optical disc is determined unequivocally from refractive index of the material of the substrate by the ISO Standard.

The present invention is now illustrated in greater detail by way of Examples and Comparative Example, but the present invention is not deemed to be limited thereto. All the parts, percents, and ratios are by weight unless otherwise indicated.

In Examples and Comparative Example, various physical properties were determined according to the following methods.

1) Number Average Molecular Weight:

The number average molecular weight was measured by gel-permeation chromatography (GPC) using THF as a solvent and polystyrene as a standard.

2) Degree of Aromatic Ring Hydrogenation (%):

The degree of aromatic ring hydrogenation was measured from UV absorption of a polyvinylcyclohexane resin dissolved in THF.

3) Softening Point (°C.):

The softening point was measured with a thermomechanical analyzer manufactured by Seiko Electron Co., Ltd. by using a probe of penetration mode under a load of 5 g and at a rate of temperature rise of 5° C./min. The specimens for measurement had a thickness of 3 mm.

4) Light Transmission (%) of Substrate:

The light transmission of the substrate was measured in accordance with JIS K6714.

5) Carrier Level (C/N Ratio) of Optical Disc:

A C/N ratio of an optical disc comprising a substrate having thereon a recording layer and a protective layer was measured by means of a dynamic properties detector having a PIN photodiode differential sensor. The result obtained in using an Al layer was taken as 0 dB. The conditions for recording and reproduction were as follows.

Recording:
CAV (contact angle velocity): 1,800 rpm
Recording site: on grooves, at a radius of 30 mm
Recording frequency: 0.5 MHz
Duty: 50%
Reproduction:
CAV: 1,800 rpm
Reproducing power: 0.8 mW 6) Contact Ancle with Water (°):

The contact angle with water was measured according to a globule method by using a detector "Model CA-DT.A" manufactured by Kyowa Kaimen Kagaku K.K. under conditions of 23° C. and 50% RH.

A globule of desalted distilled water having a diamete of about 1.5 mm was dropped on a sample. The angle formed between the globule and the surface of the sample was measured at both the left and right sides of the globule to obtain an average per measurement. Several measurements were made on different sites of the sample to obtain an average contact angle.

7) Fluorine Treatment Depth (Å):

The fluorine treatment depth measured by SIMS was measured by the following manner. The mirror surface of the treated substrate was measured for a depth profile of fluorine ions by using SIMS produced by ATOMICA Co. The sputter rate of the measured part of the substrate was obtained by determining the analyzed depth by using ALRHA STEP 200 produced by TENCOR INSTRUMENTS Co. by the feeler method with a load of 10 mg. The depth at the half value point of the maximum peak value of the depth profile was defined as the fluorine treatment depth.

The conditions for the measurement by SIMS were as follows.

Primary ion species: $O_2^+$
Acceleration voltage for primary ion: 3 keV
Current: 50 nA
Scanning width: 400 μm x 400 μm

REFERENCE EXAMPLE

Preparation of Substrate (Non-Treated)

To 100 parts of polyvinylcyclohexane having a number average molecular weight of 70,000 and a degree of aromatic ring hydrogenation of 99% which was obtained by hydrogenation of a styrene homopolymer were added 0.2 part of 1,3,5-trimethyl-2,4,6-tris-(3,5-di-t-butyl-4-hydroxybenzyl)-benzenemethane ("Irganox 1330" produced by Nippon Chiba Geigy Co.) and 0.2 part of bis(2,6-di-t-butyl-4-methylphenyl)-pentaerythritol diphosphite ("MARK PEP-36" produced by Adeka Argus Chemical Co., Ltd.), and the blend was melt-kneaded in an extruder at 260° C. to obtain pellets.

The resulting pellets were injection molded by using an injection molding machine ("M140A" produced by Meiki Co., Limited), with a grooved stamper being fixed on the movable half of the mold, at a resin temperature of 300° C. to obtain a disc having a thickness of 1.2 mm and a diameter of 130 mm.

The molded resin had a softening point of 172° C. The resulting disc had a light transmission of 90% and a contact angle with water of 103°.

EXAMPLE 1

The disc obtained in Reference Example 1 was put in a cylindrical chamber having a diameter of 18 cm, and the atmosphere was evacuated followed by displacement with nitrogen several times. The chamber was filled with a mixed gas composed of commercially available $F_2$ gas (oxygen content: 0.5% by volume) and $N_2$ having a $F_2$ concentration of 0.2 mol%. The temperature in the chamber was 17° C. while filling. Thirty minutes later, the $F_2/N_2$ mixed gas in the chamber was purged with air, and the disc was taken out.

The thus prepared substrate for optical discs had a contact angle with water of 80°. The weight gain after the mixed gas treatment with the mixed gas was 0.1% by weight or less. The fluorine treatment depth was 200 Å.

The resulting substrate was set in an apparatus of sputtering. The apparatus was evacuated to $8 \times 10^{-7}$ Torr or less, and reactive sputtering was conducted using an $Ar/O_2$ mixed gas and a Ta target to form an interference layer composed of $Ta_2O_5$ (thickness: 800 Å) on the substrate. Then, simultaneous binary sputtering was conducted using a Tb target and an FeCo target in an Ar gas to form a recording layer composed of TbFeCo (thickness: 300 Å). Finally, sputtering was conducted using an Al target having Ti chips arranged thereon in an Ar gas to form a reflective layer (thickness: 300 Å).

The resulting optical disc had a C/N ratio of 60.5 dB. The adhesion between the substrate and the recording layer was evaluated according to an adhesive tape test as follows. A square area of 1 cm × 1 cm of the mirror surface of the optical disc was crosshatched by 10 lines × 10 lines to make 100 squares each of 1 mm × 1 mm by using a cutter knife in such a manner that the cutter knife reached the substrate. An adhesive tape (base: imide film; product of Teraoka K. K.) was adhered thereto and peeled off. As a result, the recording layer was not peeled apart in any of the 100 squares.

EXAMPLE 2

The disc prepared in Reference Example was treated in the same manner as in Example 1, except for changing the $F_2$ concentration in the mixed gas to 0.5 mol%.

The resulting treated substrate had a contact angle with water of 75°, and the weight gain after the treatment was 0.1% by weight or less. The fluorine treatment depth was 400 Å.

An optical disc was prepared using the resulting substrate in the same manner as in Example 1. As a result of the adhesive tape test, the recording layer was not peeled apart in any of the 100 squares. Further, the optical disc had a C/N ratio of 60.2 dB.

EXAMPLE 3

The disc obtained in Reference Example 1 was put in a cylindrical chamber having a diameter of 18 cm, and the atmosphere was evacuated for 30 minutes. The chamber was filled with a mixed gas composed of commercially available $F_2$ gas (oxygen content: 0.3% by volume or less) and $N_2$ gas having a $F_2$ gas concentration of 5 mol% to a pressure of 210 mmHg. The temperature in the chamber was 25° C. while filling. Thirty minutes after, the $F_2/N_2$ mixed gas in the chamber was removed by evacuation for 30 minutes. The chamber was then filled with $N_2$ gas, and the disc was taken out.

The thus prepared substrate for optical discs had a contact angle with water of 64°. The weight gain after the treatment with the mixed gas was 0.1% by weight or less. The fluorine treatment depth was 900 Å.

An optical disc was prepared using the resulting substrate in the same manner as in Example 1. As a result of the adhesion tape test, the recording layer was not peeled apart in any of the 100 squares. Further, the optical disc had a C/N ratio of 60.5 dB.

COMPARATIVE EXAMPLE 1

An optical disc was prepared in the same manner as in Example 1, except for using a substrate which had not been treated with a fluorine-containing gas. As a result of the adhesive tape test, 100 squares out of 100 were peeled apart. The optical disc had a C/N ratio of 60.8 dB.

The results of the foregoing Examples and Comparative Example are shown in Table 1 below.

TABLE 1

|  | Example 1 | Example 2 | Example 3 | Comparative Example 1 |
|---|---|---|---|---|
| $F_2$ Concentration (mol %) | 0.2 | 0.5 | 1.4* | — |
| Treating Time (min) | 30 | 30 | 30 | — |
| Weight Gain (wt %) | <0.1 | <0.1 | <0.1 | — |
| Contact Angle (°) | 80 | 75 | 64 | 103 |
| Adhesive Tape Test | 0/100 | 0/100 | 0/100 | 100/100 |
| Carrier Level (C/N Ratio) (dB) | 60.5 | 60.2 | 60.5 | 60.8 |
| Fluorine treatment depth (Å) | 200 | 400 | 900 | — |

Note: *Concentration assuming that $N_2$ gas was further charged to a pressure of 760 mmHg As described above, the present invention provides a substrate for optical discs which is excellent in adhesion to a recording layer formed thereon and heat resistance while having reduced water absorption properties. Hence, the present invention is of great industrial value.

While the invention has been described in detail and with reference to specific embodiments thereof, it will be apparent to one skilled in the art that various changes and modification can be made therein without departing from the spirit and scope thereof.

What is claimed is:

1. A substrate for an optical disc comprising a transparent hydrocarbon resin having a softening point of not less than 100° C. and containing an alicyclic structure in the main chain or side chain thereof, the surface thereof having been contact treated with a fluorine-containing gas so that the treated surface has a contact angle with water of not more than 90°, the treatment depth measured by secondary ion mass spectroscopy is 2,000 Å or less and the weight gain due to the treatment does not exceed 1% by weight.

2. A substrate for an optical disc as claimed in claim 1, wherein said hydrocarbon resin is a polyvinylcyclohexane resin.

3. A substrate for an optical disc as claimed in claim 1, wherein said hydrocarbon resin has a softening point of not less than 120° C.

4. A substrate for an optical disc as claimed in claim 1, wherein said fluorine-containing gas is a mixed gas of $F_2$ and an inert gas having a fluorine content of from 0.001 to 10 mol%.

5. A substrate for an optical disc as claimed in claim 1, wherein said weight gain due to the treatment is not more than 0.1% by weight.

6. A substrate for an optical disc as claimed in claim 1, wherein the treated surface of the substrate has a contact angle with water of not more than 80°.

* * * * *